US005320459A

United States Patent [19]

Kleine

[11] Patent Number: 5,320,459

[45] Date of Patent: Jun. 14, 1994

[54] TOOL BIT FOR PERCUSSION DRILLING AND CHIPPING AND CHUCK FOR THE TOOL BIT

[75] Inventor: Werner Kleine, Achim-Uesen, Fed. Rep. of Germany

[73] Assignee: Hilti Aktiengesellschaft, Fürstentum, Liechtenstein

[21] Appl. No.: 3,180

[22] Filed: Jan. 12, 1993

[30] Foreign Application Priority Data

Jan. 13, 1992 [DE] Fed. Rep. of Germany ....... 4200643

[51] Int. Cl.[5] ........................ B23B 51/02; B23B 31/22

[52] U.S. Cl. .................................. 408/226; 279/19.3; 408/240

[58] Field of Search ........... 408/226, 227, 230, 239 R, 408/240; 279/19.2, 19.3, 19.4, 19.5, 19.6, 75, 905

[56] References Cited

U.S. PATENT DOCUMENTS 5,028,057 7/1991 Wanner ............................. 279/19.3
5,076,371 12/1991 Obermeier et al. ................ 408/226

FOREIGN PATENT DOCUMENTS 3941646 6/1991 Fed. Rep. of Germany ...... 408/226
4032739 4/1992 Fed. Rep. of Germany ...... 408/226

*Primary Examiner*—Daniel W. Howell

*Attorney, Agent, or Firm*—Anderson Kill Olick & Oshinsky

[57] ABSTRACT

A tool bit shank (11) for percussion drilling or chipping has at least three rotary entrainment grooves (13, 14, 15) extending in the axial direction and at least one locking groove (12) also extending axially. The rotary entrainment grooves (13, 14, 15) open at a free end (16) of the shank (11) so that rotary entrainment members of a tool bit chuck can be inserted axially into the rotary entrainment grooves. The locking groove is closed at its end adjacent the end face (16) to prevent ejection of the tool bit when it is engaged by a locking member of the chuck. To significantly reduce the wear of the tool bit shank and the tool bit chuck, the rotary entrainment grooves (13, 14, 15) are arranged in sequence in the circumferential direction in respect to radially outwardly facing circumferentially extending openings from the largest to the smallest opening. The locking groove (12) is located between the rotary entrainment groove (13) with the largest opening and the rotary entrainment groove (15) with the smallest opening. Similarly, the rotary entrainment members (43, 44, 45) in the tool bit chuck correspond to the size of their base cross-sections and are arranged in sequence from the largest to the smallest base cross-sections. The locking member is located between the rotary entrainment member with the largest base cross-section and the rotary entrainment member with the smallest base cross-section.

19 Claims, 2 Drawing Sheets

II
IV
11
12
13
14
15
16
17
18
19
20
22
23
24
25
27
28
29
30
31
α
β

TOOL BIT FOR PERCUSSION DRILLING AND CHIPPING AND CHUCK FOR THE TOOL BIT

BACKGROUND OF THE INVENTION

The present invention is directed to a tool bit with an axially extending shank arranged to be inserted into a tool chuck of a hand-held tool used for chipping and/or drilling and/or percussion drilling. The shank has at least three axially extending rotary entrainment grooves each of different transverse cross-sections with the grooves being open at a free end of the shank for axial introduction of rotary entrainment means in the chuck. The shank also has an axially extending locking groove closed at its end closer to the end face of the shank for limiting axial movement of the tool bit and for receiving a locking member of the tool bit chuck.

Tool bits of this general type are known, such as set forth in DE-PA 3941646 and DE-PA 4141846. These tool bits have different cross-sections for the rotary entrainment means and they can only be inserted into the tool bit chuck in an angled position.

It would seem to be disadvantageous, however, that the edge surface of the shank located between the locking groove and the rotary entrainment grooves differs greatly in magnitude. Due to the rough operation experienced at construction sites, a crushing or wearing-down of the grooves occurs in the tool bit after prolonged use, with the result that in the remaining wall thickness between the grooves stressed peaks are generated at such locations and result in fatigue failures.

SUMMARY OF THE INVENTION

The primary object of the present invention is to provide tool bits of the type described above, so that the tool bit shank is weakened to a lesser degree by the arrangement of the required rotary entrainment grooves and locking groove.

In accordance with the present invention, in a tool bit shank the rotary entrainment grooves are spaced in the circumferential direction in a sequence ranging from the largest to the smallest groove opening where the size of the openings correspond to the size of the cross-sectional areas of the grooves. Further, the locking groove is located between the rotary entrainment grooves with the largest and smallest openings. It is advantageous if the rotary entrainment grooves and their openings are arranged in the rotational direction according to the magnitude of their openings on the outer circumference of the shank, that is, ranging in sequence circumferentially from the largest to the smallest opening. This arrangement is advantageous, since the flanks of the rotary entrainment grooves leading in the rotational direction are also the flanks which are stressed by the drilling movement.

In another advantageous embodiment, a perpendicular line bisecting the secant of the locking groove opening forms an angle greater than 90° with the perpendicular line bisecting the secant of the rotary entrainment groove with the largest opening leading in the rotational direction of the tool bit. Because of these different configurations, the outer circumferential surface of the shank remaining between the grooves is subdivided more uniformly than in the past and the stress peaks developed in percussion drilling and chipping are reduced.

If the locking groove and the rotary entrainment grooves are arranged in the shank so that the area remaining between the grooves are of substantially equal size, an additional reduction of the stress peaks is achieved along with a reduction in the danger of fracture of the shank. By providing a convex shape for the inner base areas of the rotary entrainment grooves such reductions are enhanced, since the cross-sectional area of the shank is increased without any reduction of the contact surface between the flanks of the rotary entrainment members and the flanks of the rotary entrainment grooves which are significant for transmitting the torque.

It is advantageous for cost effective fabrication of the tool bit on existing automatic production machines, that the rotary entrainment grooves having the largest and smallest circumferential openings are located diametrically opposite one another and preferably with a third rotary entrainment groove located at a 90° angle to the other two grooves.

It may be necessary, because of technical reasons involved in the tool bit chuck, to strengthen the base cross-section of the smaller rotary entrainment member which adjoins the locking groove for effecting wear reduction. Such an arrangement can cause the radially outer opening of the smaller rotary entrainment groove adjacent to the locking groove to become larger than the corresponding opening of the rotary entrainment groove adjacent the above-mentioned groove. This feature does not affect the teaching of the invention if the perpendicular coordinate axes traversing the center of the shank cross-section subdivide the radially outer openings of the three rotary entrainment grooves into opening segments and if, viewed from the locking groove, the radially outer opening segments in the rotational direction upstream of the corresponding dividing coordinate axes become smaller. Accordingly, the inventive concept is directed to the feature that flanks or surfaces of the rotary entrainment grooves are stressed by the drilling movement in their optimum arrangement.

To enable the use of the tool bits of the present invention in the previously most widely sold heavy hammer-drill, which comprises a tool bit chuck with two diametrically oppositely located locking members disposed in a mirror-image pattern, usually the base of the locking groove forms a portion of a circle. Considering the aspects of wear and fatigue fractures, it was noted that other cross-sectional shapes would be advantageous.

Since in percussion drilling stress peaks result from the superposition of torque and impact stresses, the rotary entrainment grooves are preferably arranged to be axially longer than the locking groove.

Because the tool bit of the present invention requires an appropriately shaped tool bit chuck for realizing the desired advantages, the invention also involves a tool bit chuck for percussion and/or drilling tool bits with at least three rotary entrainment members or drivers arranged for axial insertion into the rotary entrainment grooves of the tool bit, and with a locking member arranged for radially inward insertion into the locking groove of the tool bit. The invention also involves the configuration of the tool bit chuck, so that the load or stress applied by it upon the tool bit is minimized, and, in addition, the wear of the tool bit chuck is reduced and any unavoidable wear is uniformly distributed.

As a result, preferably the tool bit chuck of the present invention has the rotary entrainment members disposed as a function of the size or cross-section of the rotary entrainment members disposed in sequence from the largest to the smallest cross-section viewed in the rotational direction, and with the locking member positioned between the largest and the smallest rotary entrainment members.

Furthermore, it is advantageous if a perpendicular line bisecting the secant of the locking groove to receive the locking member forms an angle greater than 90° with a perpendicular line bisecting the secant of the largest rotary entrainment member. In another preferred embodiment, the angle between the locking member and the adjacent smaller rotary entrainment member is smaller than 90°. It is expedient for a more favorable wear characteristic in the bore of the tool bit chuck, that the rotary entrainment members or drivers are disposed approximately at right angles to one another, whereby a uniform load-carrying pattern is achieved during operation.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

Figures 1, 2, 3, 4:
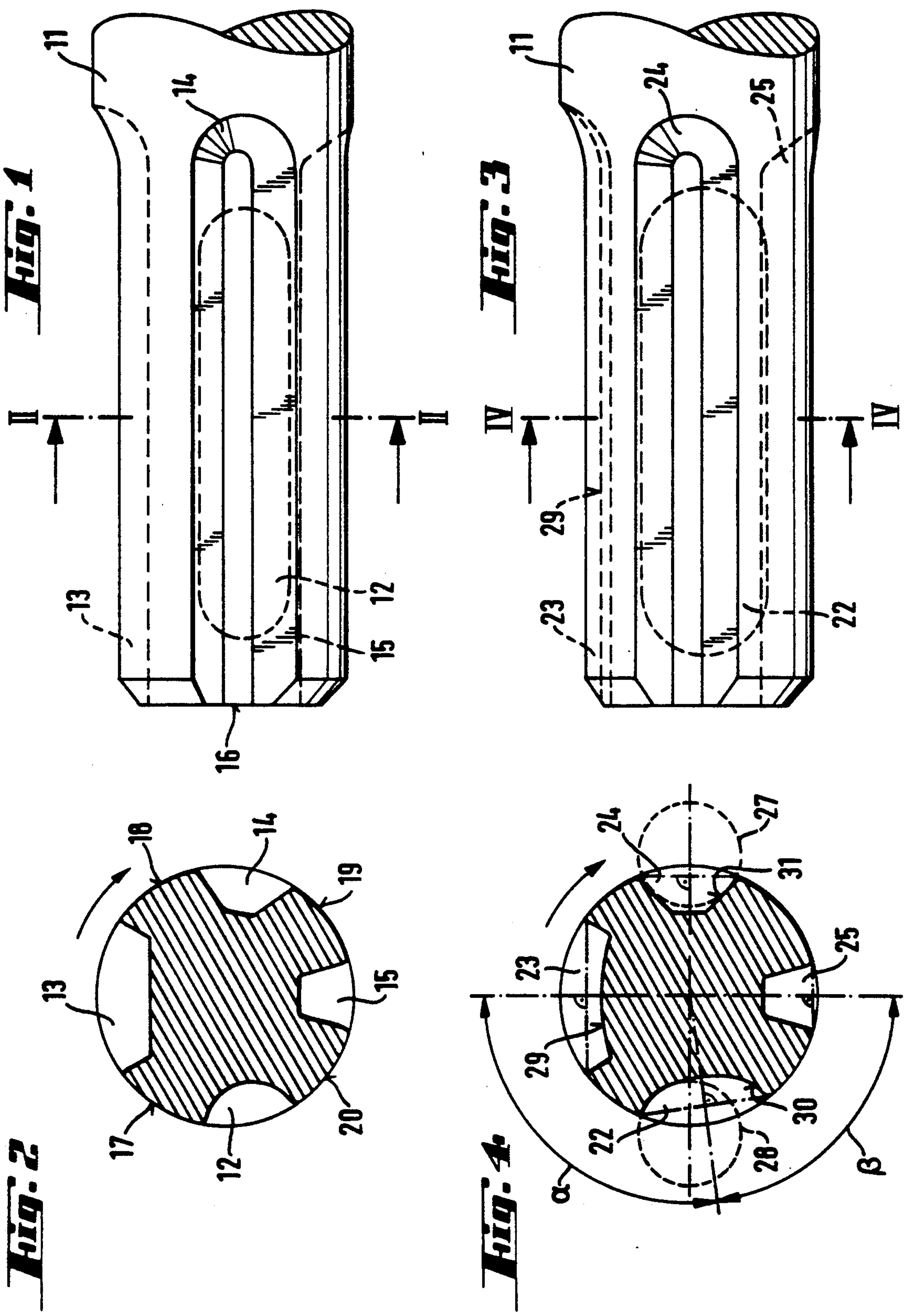
FIG. 1 is an axially extending side view of a shank end of a tool bit embodying the present invention.
FIG. 2 is a cross-sectional view taken along the line II—II of the shank shown in FIG. 1.
FIG. 3 is a view similar to FIG. 1 of another embodiment of a tool bit shank embodying the present invention.
FIG. 4 is a cross-sectional view taken along the line IV—IV of the shank illustrated in FIG. 3.

In FIGS. 1 and 2 an axially extending shank 11 of a tool bit is illustrated and has an axially extending locking groove 12 and three axially extending rotary entrainment grooves 13, 14, 15. In FIG. 2 an arrow displays the rotational direction of the tool bit when it is drilling. The rotary entrainment grooves 13, 14, 15 are spaced in the rotational direction as a function of the size of the radially outer openings and, as considered from the locking groove 12, in the rotational direction the entrainment groove openings become smaller. The locking groove 12 is located between the largest rotary entrainment groove 13 and the smallest rotary entrainment groove 15. The cross-sectional areas of the shank 11 between the grooves 12, 13, 14, 15 are approximately of equal size. As can be noted in FIG. 1, the rotary entrainment grooves 13, 14, 15 are open at the free end 16 of the shank 11, so that the tool bit shank can be inserted axially into a tool bit chuck, not shown, which has strip-shaped rotary entrainment members or drivers shaped to correspond to the shapes of the grooves 13, 14, 15. It is evident, though the rotary entrainment grooves each have a very significantly different cross-sectional area transverse to the axial direction, that the tool bit has to be inserted in one single position into the tool bit chuck, and a favorable distribution of the loads developed during operation is achieved by the uniform division of the cross-sectional area and by the arrangement of the rotary entrainment grooves and the locking groove.

In FIGS. 3 and 4 the tool bit shank 11 has three rotary entrainment grooves 23, 24, 25 disposed at right angles to one another. A locking groove 22, relative to the largest entrainment groove 23, is disposed at an angle $\alpha$ larger than 90°. As a result, the locking groove 22 forms an angle $\beta$ less than 90° with the smallest rotary entrainment groove 25. Such an arrangement affords a better subdivision of the cross-sectional area of the shank.

In FIG. 4 two locking members 27, 28 of a widely sold heavy hammerdrill are displayed in dashed lines and, as shown, the tool bit shank of the present invention can be inserted into such a hammerdrill, because the cross-sectional shape 30 of the locking groove 22 and the cross-sectional shape 31 of the rotary entrainment groove 24 are appropriately configured. Due to the arrangement of the rotary entrainment grooves 23, 24, 25 at right angles to one another, the shank shown in FIG. 4 is particularly suited for mechanized fabrication. The radially inner base surface of the largest rotary entrainment groove 23 is convex and, as a result, increases the transverse cross-sectional area of the shank.

Figure 5:
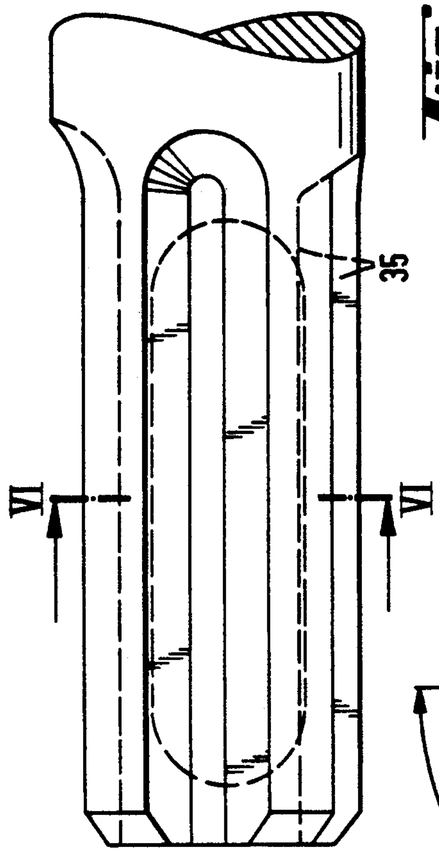
FIG. 5 is a view similar to FIGS. 1 and 3 of still another embodiment of a tool bit shank embodying the present invention.
Figure 6:
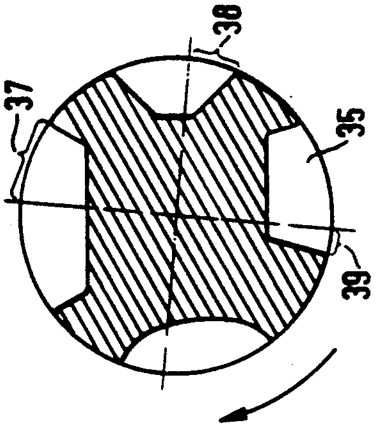
FIG. 6 is a cross-sectional view taken along the line VI—VI of the shank shown in FIG. 5.

The embodiment displayed in FIGS. 5 and 6 differs from the embodiment in FIGS. 3 and 4 by the rotary entrainment groove 35 having a larger radially outer opening and arranged asymmetrically. The perpendicular coordinate axes through the center of the shank cross-section in FIG. 6 divide the openings of the rotary entrainment grooves into segments with the segments leading in the rotational direction and relative to the coordinate axes being progressively smaller as considered from the locking groove.

Figure 7:
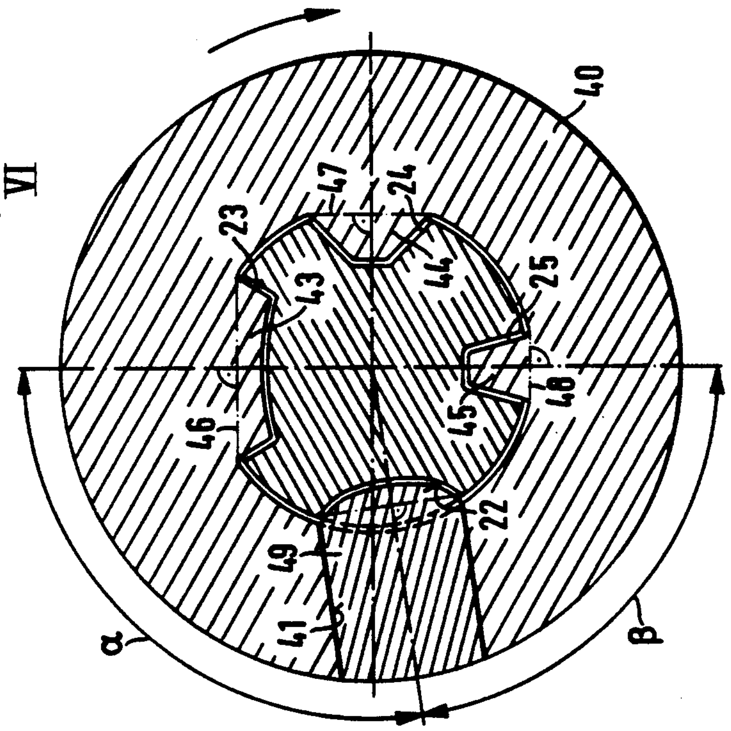
FIG. 7 transverse cross-sectional view through a tool bit chuck for a hammerdrill with the shank of a tool bit inserted into the chuck.

A tool bit chuck 40 of a hammerdrill is shown in transverse cross-section in FIG. 7. The chuck 40 has rotary entrainment members or drivers 43, 44, 45 shaped to correspond to the rotary entrainment grooves 23, 24, 25. A locking member 49 is guided in an opening 41 through the chuck 40 and seats into the locking groove 22 of the shank. In this embodiment, the locking member 49 is offset with respect to the largest rotary entrainment member 43 by an angle $\alpha$ greater than 90° and is offset at an angle $\beta$ smaller than 90° with respect to the smallest rotary entrainment member 45. The base of the cross-sectional areas 46, 47, 48 of the rotary entrainment members 43, 44, 45 become smaller as viewed from the locking member and in the rotational direction as shown by the arrow.

In a surprisingly simple manner, the tool bit and the tool bit chuck of the present invention reduce the wear and fatigue failure problems. No additional costs are involved as compared to the tool bits previously known. It is possible to perform the fabrication in existing fabrication installations.

The above description and the drawing are only confined to the listing of the characteristics essential for the present invention. To the extent that the characteristics of the invention are disclosed in the drawing and are not mentioned in the claims they serve, if required, also for the definition of the subject of the invention. Other embodiment forms neither described nor depicted here are possible if based on the inventive concept. This is especially true also for cross-sectional shapes of the rotary entrainment grooves, where the grooves can be shaped as planar surfaces or as portions of circles. This same feature applies to the cross-sectional shape of the locking grooves.

While specific embodiments of the invention have been shown and described in detail to illustrate the inventive principles, it will be understood that the invention may be embodied otherwise without departing from such principles.

I claim:

1. Tool bit comprising an axially extending shank having a free end arranged to be inserted into a tool bit chuck in a hand-held tool used for chipping and/or drilling and/or percussion drilling, said shank has at least three axially extending rotary entrainment grooves (13, 14, 15, 23, 24, 25, 35) each of a different cross-section transverse to the axial direction, said rotary entrainment grooves are open at the free end (16) of said shank for axial insertion therein of rotary entrainment members of the tool bit chuck, said shank having an axially extending locking groove (12, 22) closed at an end thereof closer to said free end (16) of said shank and arranged to receive a locking member of the tool bit chuck for limiting axial movement of said tool bit, wherein the improvement comprises that said rotary entrainment grooves (13, 14, 15, 23, 24, 25, 35) each have a different circumferential opening in the radially outer surface of said shank and said rotary entrainment grooves are arranged to correspond with the circumferential extent of at least circumferential portions of the circumferential openings arranged in sequence in the circumferential direction from a largest to a smallest, and said locking groove is disposed circumferentially from and between said at least largest and smallest circumferential portions.

2. Tool bit, as set forth in claim 1, wherein said shank has a rotational direction when inserted into a tool bit chuck and the rotary entrainment grooves (13, 14, 15, 23, 24, 25), viewed in the rotational direction from the locking grooves (12), have the openings in the radially outer surface of said shank arranged in size from the largest to the smallest opening.

3. Tool bit, as set forth in claim 2, wherein a perpendicular line bisecting a secant of the locking groove (22) forms an angle $\alpha$ greater than 90° with a perpendicular line bisecting a secant of the rotary entrainment groove (23) having the largest opening in the radially outer circumferential surface of said shank.

4. Tool bit, as set forth in claim 3, wherein a perpendicular line bisecting the secant of the locking groove (22) and a perpendicular line bisecting the secant of the rotary entrainment groove (25) having the smallest opening in the radially outer surface of said shank form an angle $\beta$ less than 90°.

5. Tool bit, as set forth in claim 2, wherein the radially outer surface areas (17, 18, 19, 20) of said shank between said locking groove (12) and said rotary entrainment grooves (13, 14, 15) are approximately of equal size.

6. Tool bit, as set forth in claim 5, wherein said radially outer surface areas (17, 18, 19, 20) are of exactly the same size.

7. Tool bit, as set forth in claim 5, wherein at least said rotary entrainment groove having the largest opening in the radially outer circumferential surface of said shank has a convexly-shaped base surface (29).

8. Tool bit, as set forth in claim 5, wherein said rotary entrainment grooves (13, 14, 15, 23, 24, 25, 35) each have a convexly-shaped base surface (29).

9. Tool bit, as set forth in claim 2, wherein said rotary entrainment groove having the largest opening (23) and the rotary entrainment groove with the smallest opening (25) are located approximately diametrically opposite one another and said rotary entrainment groove (24) located in circumferential direction between said rotary entrainment groove having the largest opening and said rotary entrainment groove having the smallest opening being disposed at an angle of approximately 90° between said grooves.

10. Tool bit, as set forth in claim 2, wherein said rotary entrainment groove (23) having the largest opening and said rotary entrainment groove (25) with the smallest opening are located exactly diametrically opposite one another and said rotary entrainment groove (24) located in the circumferential direction between said rotary entrainment groove with the largest opening and said rotary entrainment groove with the smallest opening is disposed therebetween at an angle of exactly 90°.

11. Tool bit, as set forth in claim 2, wherein perpendicular coordinate axes intersecting at a center point of said shank and extending through and intersecting the openings of said rotary entrainment grooves and said locking groove subdivide the openings of said rotary entrainment grooves and locking groove into segments with said segments (37, 38, 39) leading in the rotational direction of said tool bit being of decreasing size from said largest rotary entrainment groove to said smallest rotary entrainment groove.

12. Tool bit, as set forth in claim 2, wherein said locking groove (22) and the opposite said rotary entrainment groove (24) have different cross-sectional shapes with each said cross-sectional shape shaped to receive a locking member (27), (28) of equal size and arranged in mirror-image fashion.

13. Tool bit, as set forth in claim 12, wherein said locking groove (22) has an arcuate base not forming a part of a circle.

14. Tool bit, as set forth in claim 2, wherein in the axial direction said rotary entrainment grooves (13, 14, 15, 23, 24, 25, 35) are larger than the axial extent of said locking groove (12, 22).

15. Tool bit chuck for percussion and/or drilling tool bits, said chuck having an axial bore therein, at least three rotary entrainment members (43, 44, 45) projecting radially into said bore and arranged for axial insertion into rotary entrainment grooves 23, 24, 25) of tool bits, a locking member (49) located in said chuck for radially inward insertion into a locking groove (22) in the tool bit, said locking member being guided in an opening (41) in said chuck, wherein the improvement comprises that said rotary entrainment members (43, 44, 45) viewed in the circumferential direction are arranged corresponding to the size of base cross-sections (46, 47, 48) of said rotary entrainment members and arranged in sequence from the largest to the smallest base cross-section (46, 47 and 48) and spaced apart in the circumferential direction, and said locking member is located between and is spaced from the rotary entrainment members (43, 45) having the largest and smallest base cross-sections (46, 48), and said chuck having a rotational direction and as viewed in the rotational direction from said locking member (49) the rotary entrainment members are arranged from the largest (43) to the smallest (45).

16. Tool bit chuck, as set forth in claim 15, wherein a perpendicular line bisecting the secant of the opening (41) for the locking member (49) in said bore forms an angle greater than 90° with a perpendicular line bisecting the secant of the largest rotary entrainment member (46).

17. Tool bit chuck, as set forth in claim 15, wherein said locking member (49) is located adjacent to the smallest rotary entrainment member (45) and a perpendicular line bisecting the secant of the opening (41) for the locking member (49) and extending inwardly into said chuck bore, forms an angle $\beta$ less than 90° with a perpendicular line bisecting the secant of the smallest rotary entrainment member (45).

18. Tool bit chuck, as set forth in claim 15, wherein said rotary entrainment member (43) having the largest base and the rotary entrainment member (45) having the smallest base lie at least approximately diametrically opposite each other and said rotary entrainment member (44) having the base smaller than the largest cross-section and larger than the smallest cross-section is arranged between the largest cross-section base and the smallest cross-section base at an angle of approximately 90°.

19. Tool bit chuck, as set forth in claim 15, wherein said locking member (49) has an end extending into said bore in said chuck and the end has a shape which does not form a part of a circle.

* * * * *